United States Patent
Quarin et al.

(10) Patent No.: US 8,322,144 B2
(45) Date of Patent: Dec. 4, 2012

(54) TURBOMACHINE NOZZLE COWL HAVING PATTERNS WITH LATERAL FINS FOR REDUCING JET NOISE

(75) Inventors: Benedetta Quarin, Pomezia (IT); Kamel Zeggai, Bondy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/321,382

(22) PCT Filed: Apr. 16, 2010

(86) PCT No.: PCT/FR2010/050736
§ 371 (c)(1),
(2), (4) Date: Jan. 31, 2012

(87) PCT Pub. No.: WO2010/133780
PCT Pub. Date: Nov. 25, 2010

(65) Prior Publication Data
US 2012/0118398 A1    May 17, 2012

(30) Foreign Application Priority Data
May 20, 2009 (FR) ...................................... 09 53355

(51) Int. Cl.
*F02K 1/00* (2006.01)
(52) U.S. Cl. ........................................ 60/770; 60/226.1
(58) Field of Classification Search .................... 60/262, 60/264, 770, 771; 239/265.17, 265.19; 181/213, 181/220
See application file for complete search history.

(56) References Cited

U.S. PATENT DOCUMENTS

| 4,487,017 A | * | 12/1984 | Rodgers ........................ 60/262 |
| 4,543,784 A | | 10/1985 | Kirker |
| 4,576,002 A | | 3/1986 | Mavrocostas |
| 6,314,721 B1 | | 11/2001 | Mathews et al. |
| 6,532,729 B2 | | 3/2003 | Martens |
| 7,506,501 B2 | * | 3/2009 | Anderson et al. ............... 60/262 |
| 8,087,250 B2 | * | 1/2012 | Gutmark et al. ............... 60/770 |
| 2005/0138915 A1 | | 6/2005 | Bardagi et al. |
| 2006/0010853 A1 | | 1/2006 | Goutines et al. |

(Continued)

FOREIGN PATENT DOCUMENTS
DE    10 2004 004076    8/2005
(Continued)

OTHER PUBLICATIONS
International Search Report issued Jul. 20, 2010 in PCT/FR2010/050736 filed Apr. 16, 2010.

*Primary Examiner* — Phutthiwat Wongwian
(74) *Attorney, Agent, or Firm* — Oblon, Spivak, McClelland, Maier & Neustadt, L.L.P.

(57) ABSTRACT

An annular cowl for a turbomachine nozzle, the cowl including a plurality of patterns arranged to extend a trailing edge of the cowl and circumferentially spaced apart from one another. Each pattern has an outline of substantially polygonal shape with a base formed by a portion of the trailing edge of the cowl and at least one vertex that is spaced downstream from the base and that is connected thereto by lateral edges, and in each of its lateral edges, each pattern includes at least one fin, each fin being inclined radially relative to the pattern in a plane that is inclined at an angle lying in the range 0° to 45° relative to a radial direction.

9 Claims, 2 Drawing Sheets

U.S. PATENT DOCUMENTS

| | | |
|---|---|---|
| 2007/0033922 A1* | 2/2007 | Reba et al. .............. 60/262 |
| 2008/0041062 A1 | 2/2008 | Au et al. |
| 2008/0047273 A1 | 2/2008 | Au et al. |
| 2009/0084111 A1 | 4/2009 | Aeberli et al. |

FOREIGN PATENT DOCUMENTS

| | | |
|---|---|---|
| EP | 0 984 152 | 3/2000 |
| EP | 1 482 160 | 12/2004 |
| EP | 1 617 068 | 1/2006 |
| EP | 1 873 388 | 1/2008 |
| EP | 1 873 389 | 1/2008 |
| EP | 2 042 721 | 4/2009 |
| FR | 2 902 468 | 12/2007 |
| FR | 2 920 036 | 2/2009 |
| GB | 2 082 259 | 3/1982 |
| GB | 2 146 702 | 4/1985 |

* cited by examiner

TURBOMACHINE NOZZLE COWL HAVING PATTERNS WITH LATERAL FINS FOR REDUCING JET NOISE

BACKGROUND OF THE INVENTION

The present invention relates to the general field of reducing jet noise at the outlet from a turbomachine nozzle. It relates more particularly to a cowl for a turbomachine nozzle of the separate-stream type that is provided with patterns for reducing jet noise.

Nowadays, sound pollution has become a major concern for engine manufacturers who are being confronted more and more with the acoustic nuisance of their turbomachines. The sources of noise in a turbomachine are numerous, but it has been observed that the jet noise at the outlet from the nozzle is the noise that predominates during airplane takeoff. Since certification authorities are becoming more and more demanding in terms of sound emission from turbomachines, engine manufacturers are being required to reduce the noise from their turbomachines, and in particular to reduce jet noise at the outlet from nozzles.

Typically, a separate-stream nozzle for a turbomachine has a primary cowl centered on the longitudinal axis of the turbomachine, a secondary cowl arranged concentrically around the primary cowl so as to define a first annular channel in which an outer stream (or cold stream) flows, and a central body arranged concentrically inside the primary cowl so as to define a second annular channel in which an inner stream (or hot stream) flows, with the primary cowl extending beyond the secondary cowl.

In such a nozzle, the jet noise comes from mixing taking place both between the hot and cold streams and between the cold stream and the outer air surrounding the nozzle. This noise is noise occupying a broad frequency band and it is generated by two types of sound source: high frequency noise coming from small turbulent structures of the mixing between the streams, which noise is perceived essentially while close to the nozzle; and low frequency noise coming from large vortex structures that appear a long way from the jet.

In order to reduce jet noise, one of the means used is to increase the efficiency with which the streams mix together. For this purpose, it is known to provide at least one of the cowls of the nozzle with a plurality of repetitive patterns that are distributed around the entire circumference of the trailing edge of the cowl. By putting such patterns into place on the trailing edge of the cowl of the nozzle, mixing between the streams is achieved by creating turbulence (or vortices) close to the nozzle in order to dissipate kinetic energy better, and consequently reduce the turbulent intensity of the large vortices that constitute the major sources of noise.

By way of example, U.S. Pat. No. 6,532,729 provides for fitting the trailing edges of the primary and secondary cowls of the nozzle with a plurality of repetitive patterns of triangular shape (referred to as chevrons) that serve to enhance mixing between the streams flowing past either side of these patterns.

Such patterns serve to enhance mixing between the streams, in particular by reducing the low frequency component of the jet noise. This reduction, which needs to be increased, is nevertheless obtained at the cost of a penalty on the performance of the turbomachine, since the efficiency of the nozzle is degraded.

OBJECT AND SUMMARY OF THE INVENTION

A main object of the present invention is thus to mitigate such drawbacks by proposing a particular geometrical shape for jet noise reduction patterns enabling jet noise to be reduced further, while also limiting the impact of the patterns on the aerodynamic performance of the nozzle.

This object is achieved by an annular cowl for a turbomachine nozzle, the cowl including a plurality of patterns arranged to extend a trailing edge of the cowl and spaced apart circumferentially from one another, each pattern having an outline that is substantially polygonal in shape with a base formed by a portion of the trailing edge of the cowl and at least one vertex spaced downstream from the base and connected thereto by lateral edges, wherein, in accordance with the invention, each pattern includes, in each of its side edges, at least one fin, each fin being inclined radially relative to the pattern in a plane that is inclined at an angle lying in the range 0° to 45° relative to a radial direction.

The presence of fins on the lateral edges of the polygonal patterns for noise reduction serve to increase the capacity of these patterns for generating turbulence constituting sources for mixing between the streams flowing on either side of the cowl. These fins that are radially inclined relative to the triangular patterns create a step that causes the flows of the streams to roll up, thereby enhancing mixing between the streams.

In an advantageous provision, each fin possesses an upstream end connected to the lateral edge of the pattern that is spaced apart from the base of the pattern by a distance corresponding to at least 15% of the distance between the base and the vertex of the pattern, and a downstream end connecting to the lateral edge of the pattern that is spaced apart from the vertex of the pattern by a distance corresponding to at least 15% of the distance between the base and the vertex of the pattern. This particular arrangement of the fins (relative to the base and to the vertex of a triangular pattern) serves to create an opening for the flows of the streams at the outlet from the patterns, thereby limiting the drag of the fins and thus the aerodynamic performance of the nozzle.

In accordance with another advantageous provision, the end of each fin that is furthest from the corresponding side edge of the pattern is spaced apart therefrom by a distance corresponding to at least 30% of the distance between the base and the vertex of the pattern.

Each polygonal pattern may present an outline that is of substantially triangular shape. Likewise, each fin may present an outline of substantially triangular shape, with a base formed by a portion of the lateral edge of the pattern, and with a vertex that is spaced apart from the base and that is connected thereto by lateral edges. Under such circumstances, the lateral edges of each fin advantageously present a profile that is curved with the vertex thereof being rounded.

Likewise, the lateral edges of each pattern advantageously present a curved profile and the vertex thereof is rounded.

In an embodiment, each pattern includes, in each of its lateral edges, two fins, one of the fins being inclined radially inwards relative to the pattern and the other fin being inclined radially outwards relative to the pattern.

The invention also provides a turbomachine nozzle in which the primary cowl and/or the secondary cowl is a cowl as defined above.

The invention also provides a turbomachine including at least one cowl as defined above.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF EMBODIMENTS

Figure 1:
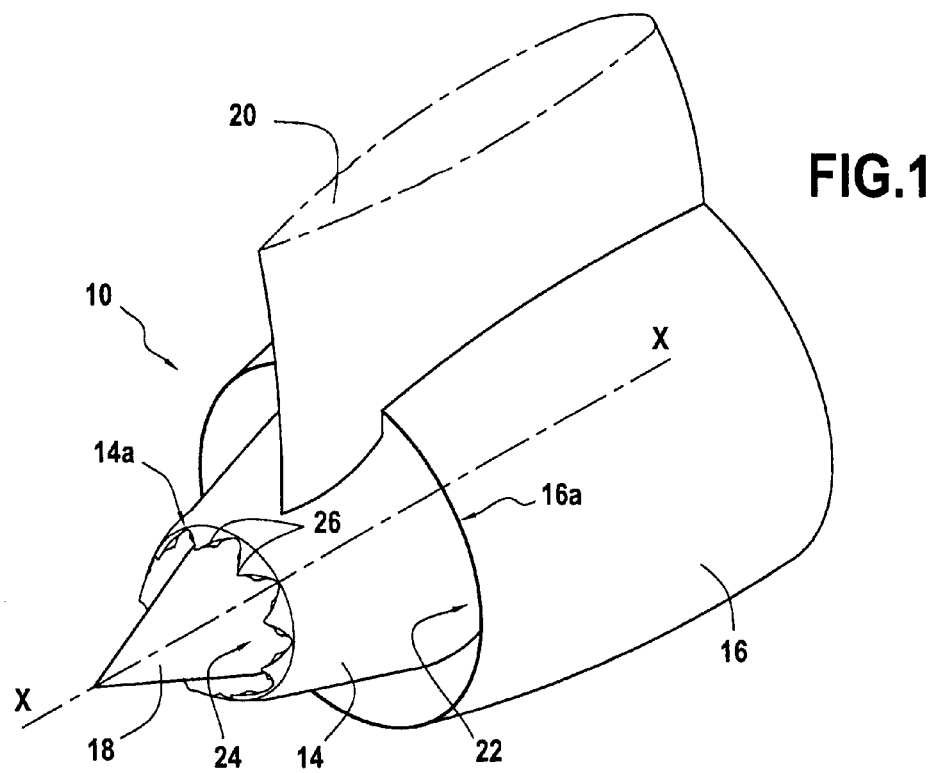
FIG. 1 is a diagrammatic perspective view of a turbomachine nozzle fitted with a cowl in an embodiment of the invention.

FIG. 1 is a highly diagrammatic perspective view of a separate-stream nozzle 10 of a turbomachine.

The nozzle 10 is of axially symmetrical shape about its longitudinal axis X-X and it is typically formed by a primary cowl 14, a secondary cowl 16, and a central body 18, all three of which are centered on the longitudinal axis X-X of the nozzle.

The primary cowl 14 is substantially cylindrical or frustoconical in shape and it extends along the axis X-X of the nozzle. The central body 18 is arranged concentrically inside the primary cowl 14 and it is terminated by a substantially conical portion.

The secondary cowl 16 is also substantially cylindrical or frustoconical in shape, it surrounds the primary cowl 14, while being concentric therewith, and it also extends along the longitudinal axis X-X of the nozzle. The primary cowl 14 extends longitudinally downstream beyond the secondary cowl 16.

It should be observed in the embodiment of FIG. 1 that the central body 18 of the nozzle 10 is of the external type, i.e. the central body 18 extends longitudinally beyond the trailing edge 14a of the primary cowl 14.

Nevertheless, the invention is equally applicable to a separate-stream nozzle of the internal type in which the trailing edge of the primary cowl extends longitudinally beyond the central body so as to cover it completely. Similarly, the invention may also be applied to a so-called "mixed-stream" nozzle in which the trailing edge of the secondary cowl extends longitudinally beyond the trailing edge of the primary cowl.

The separate-stream nozzle as defined in this way is fastened beneath an airplane wing (not shown in the figures) by means of a support pylon 20 engaging the secondary cowl 16 of the nozzle and extending into the inside of the secondary cowl as far as the primary cowl 14.

The concentric assembly of the elements of the nozzle 10 makes it possible to define firstly between the primary and secondary cowls 14 and 16 a first annular channel 22 for the flow of air coming from the turbomachine and referred to as the secondary stream or cold stream, and secondly between the primary cowl 14 and the central body 18, a second annular channel 24 for the flow of an internal gas stream coming from the turbomachine and also referred to as the primary stream or the hot stream.

The primary and secondary streams flowing in these two annular channels 22 and 24 mix together at a trailing edge 14a of the primary cowl 14. Similarly, the secondary stream mixes with an external air stream flowing round the nozzle over a trailing edge 16a of the secondary cowl 16.

At least one of the two cowls 14 and 16 of the nozzle 10 has a plurality of repetitive patterns 26 that are intended to reduce the jet noise at the outlet from the nozzle.

In the embodiment of FIG. 1, the jet noise reduction patterns 26 are arranged on the primary cowl 14. Nevertheless, they could equally well be arranged solely on the secondary cowl 16, or indeed both on the primary cowl and on the secondary cowl of the nozzle.

The jet noise reduction patterns 26 are arranged to extend the trailing edge 14a of the primary cowl 14 and they are regularly spaced apart from one another in the circumferential direction. They may be distributed over all or only a part of the circumference of the primary cowl.

Each pattern also presents an outline of substantially polygonal general shape having a base formed by a portion of the trailing edge 14a of the cowl 14 and at least one vertex spaced apart downstream from the base and connected thereto by two lateral edges.

Thus, in the embodiment of FIGS. 1 to 6, each pattern 26 presents an outline that is of generally triangular shape with a base 26a and a vertex 26b that is spaced apart downstream from the base 26a and that is connected thereto by two lateral edges 26c.

Naturally, other polygonal shapes could be envisaged for the outline of the patterns 26. They could thus present an outline that is trapezoidal in shape with a base and two vertices each connected to the base by a lateral edge.

Figure 2:
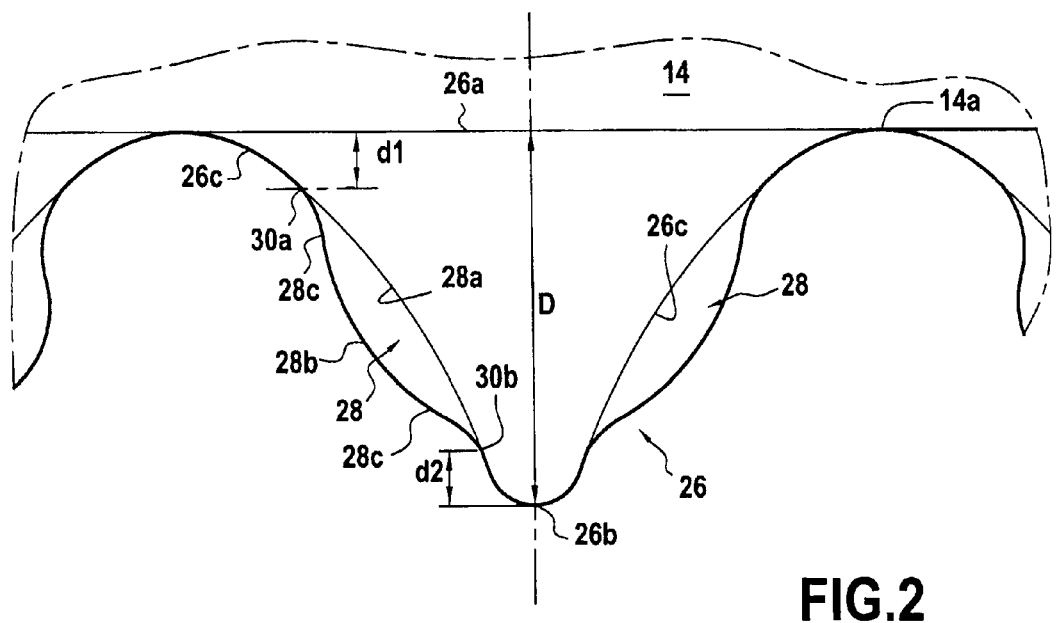
FIG. 2 is an enlarged view of a jet noise reduction pattern of the FIG. 1 cowl.

As shown in greater detail in FIG. 2, the lateral edges 26c of each pattern 26 advantageously presents a curved profile and the vertex 26b thereof is preferably rounded.

According to the invention, each noise reduction pattern 26 includes, in each of its side edges 26c, at least one fin 28 that is radially inclined relative to the pattern.

Figure 3:
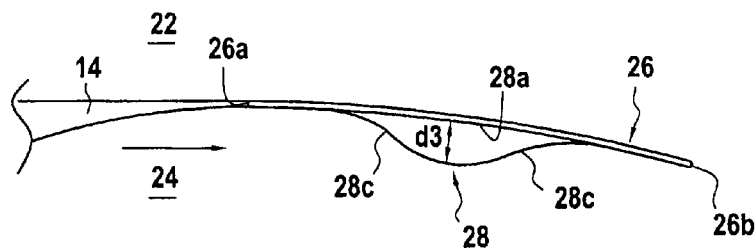

As shown in FIG. 3, the noise reduction patterns 26 are arranged to extend the primary cowl 14 axially, whereas the fins 28 are inclined radially towards the inside of the primary cowl, i.e. they penetrate into the second channel 24 in which the hot stream flows. Naturally, the fins could equally well be inclined radially towards the outside of the primary cowl, i.e. they could penetrate into the first channel 22 in which the cold stream flows.

Figure 4:
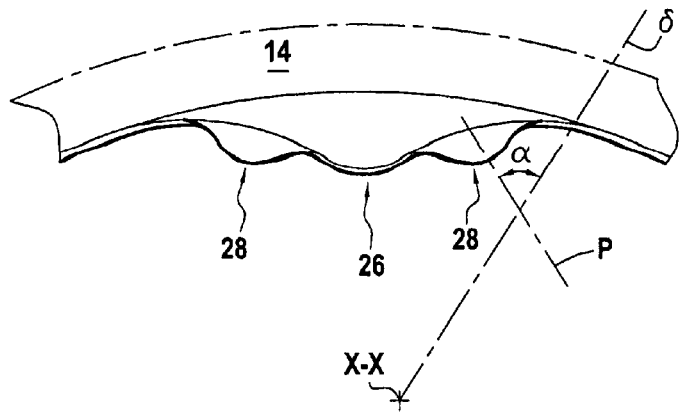
FIGS. 3 and 4 are a side view and a face view respectively of the FIG. 2 pattern.

Thus, as shown in FIG. 4, each of the fins 28 of the noise reduction patterns is contained in a plane P that is inclined preferably at an angle a lying in the range 0° to 45° relative to a radial direction δ. Thus, the fins 28 are connected to the lateral edges of the patterns along ridges (or projecting angles).

The fins 28 of the noise reduction patterns 26 present a certain number of geometrical characteristics. In particular, and advantageously, each fin presents an upstream end 30a connecting it to the corresponding side edge 26c of the pattern that is spaced apart from the base 26a of the pattern by a distance d1 corresponding to at least 15% of the distance D between the base 26a and the vertex 26b of the pattern, and a downstream end 30b connecting to the side edge of the pattern that is spaced apart from the vertex of the pattern by a distance d2 corresponding to at least 15% of the distance D between the base and the vertex of the pattern.

In other words, the geometrical profile of a side edge 26c of a noise reduction pattern remains unchanged firstly in a zone starting from the base 26a of the pattern and extending axially downstream over a distance corresponding to at least 15% of the distance D, and secondly in a zone starting from the vertex 26b of the patterns and extending axially upstream over a distance corresponding to at least 15% of the same distance D. Thus, the presence of the fins 28 on the side edges of the noise reduction patterns does not significantly increase their drag and thus limits any effect on the aerodynamic performance of the nozzle.

Preferably, each fin 28 itself presents an outline that is substantially triangular in shape with a base 28a formed by a portion of the side edge 26c of the pattern, and a vertex 28b that is spaced apart from the base and that is connected thereto by side edges 28c. Under such circumstances, and as for the profile of the noise reduction patterns 26, the side edges 28c of the fins advantageously present respective profiles that are curved, and the vertex 28b of each fin is preferably rounded. Naturally, other geometrical shapes could be envisaged for the fins. Thus, they could alternatively be rectangular in shape.

According to another advantageous characteristic of the invention, the end of each fin 28 that is furthest from the corresponding side edge 26c of the pattern 26 (i.e. the vertex 28b of the fin when it is triangular in shape) is spaced apart therefrom by a distance d3 corresponding to at least 30% of the distance D between the base 26a and the vertex 26b of the pattern.

Figure 5:
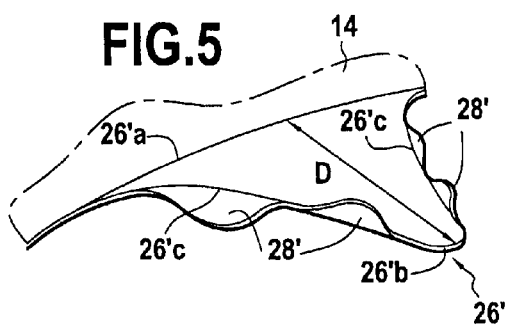
FIGS. 5 and 6 are a profile view and a side view respectively of a noise reduction pattern of a cowl in another embodiment of the invention.
Figure 6:
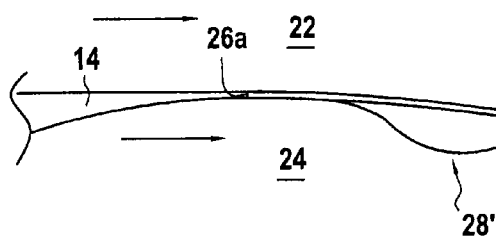

With reference to FIGS. 5 and 6, there follows a description of another embodiment of a noise reduction pattern 26' for a turbomachine nozzle cowl.

This noise reduction pattern 26' differs from that described above in that it has two fins 28' on each of its lateral sides 26'c, both fins being inclined radially relative to the pattern.

More precisely, one of these fins 28' is inclined radially towards the inside of the cowl 14 (i.e. it penetrates into the second channel 24 in which the hot stream flows), while the other fin is inclined radially towards the outside of the same cowl (i.e. it penetrates into the first channel 22 in which the cold stream flows).

Furthermore, as in the above-described other embodiment, these fins 28' are arranged in such a manner that the geometrical profile of each lateral edge 26'c of the noise reduction patterns remains unchanged, firstly in a zone starting from the base 26'a of each pattern and extending axially downstream over a distance corresponding to at least 15% of the distance D, and secondly in a zone starting from the vertex 26'b of the pattern and extending radially upstream over a distance corresponding to at least 15% of the distance D.

Finally, the advantages of the noise reduction patterns described with reference to the other embodiment apply equally to the patterns of this embodiment.

The invention claimed is:

1. An annular cowl for a turbomachine nozzle, the annular cowl comprising: a plurality of patterns arranged to extend a trailing edge of the annular cowl for the turbomachine nozzle and circumferentially spaced apart from one another, each pattern having an outline of substantially triangular shape with a base formed by a portion of the trailing edge of the annular cowl and a vertex that is a point of the outline that is spaced furthest downstream away from the base and that is connected thereto by two lateral edges, wherein each pattern includes, in each of the two lateral edges, at least one fin, each fin being inclined radially relative to the pattern in a plane that is inclined at an angle lying in a range 0° to 45° relative to a radial direction.

2. The annular cowl according to claim 1, wherein each fin includes an upstream end connected to the lateral edge of the pattern that is spaced apart from the base of the pattern by a distance corresponding to at least 15% of the distance between the base and the vertex of the pattern, and a downstream end connected to the lateral edge of the pattern that is spaced apart from the vertex of the pattern by a distance corresponding to at least 15% of the distance between the base and the vertex of the pattern.

3. The annular cowl according to claim 1, wherein the end of each fin that is furthest from the corresponding lateral edge of the pattern is spaced apart therefrom by a distance corresponding to at least 30% of the distance between the base and the vertex of the pattern.

4. The annular cowl according to claim 1, wherein each fin presents an outline of substantially triangular shape with a base formed by a portion of the lateral edge of the pattern, and a vertex that is spaced apart from the base and that is connected thereto by lateral edges.

5. The annular cowl according to claim 4, wherein the lateral edges of each fin present a profile that is curved with the vertex thereof being rounded.

6. The annular cowl according to claim 1, wherein the lateral edges of each pattern present a curved profile and the vertex thereof is rounded.

7. The annular cowl according to claim 1, wherein each pattern includes, in each of the two lateral edges, two fins, one of the fins being inclined radially inwards relative to the pattern and the other fin being inclined radially outwards relative to the pattern.

8. A turbomachine nozzle comprising:
a primary cowl arranged along a longitudinal axis of the nozzle; and
a secondary cowl arranged concentrically around the primary cowl,
wherein the primary cowl and/or the secondary cowl is the annular cowl according to claim 1.

9. A turbomachine comprising:
a nozzle including at least one cowl according to claim 1.

* * * * *